(12) United States Patent
Cappa et al.

(10) Patent No.: US 11,254,040 B2
(45) Date of Patent: Feb. 22, 2022

(54) SURFACING PROCESS, SURFACED OR RESURFACED METAL PART

(71) Applicants: COMPAGNIE GENERALE DES ETABLISSEMENTS MICHELIN, Clermont-Ferrand (FR); ASSOCIATION POUR LA RECHERCHE DEVELOPPEMENT DES METHODES ET PROCESSUS INDUSTRIELS—A.R.M.I.N.E.S, Paris (FR); ECOLE NATIONALE D'INGENIEURS DE SAINT ETIENNE, Saint Etienne (FR); DMA LASER, St Martin la Plaine (FR)

(72) Inventors: Bernard Cappa, Clermont-Ferrand (FR); Cédric Carlavan, Clermont-Ferrand (FR); Christophe Colin, Evry (FR); Maryane Jacquier, Saint-Heand (FR); Julien Sijobert, Boisset Saint Priest (FR); Ludovic Thivillon, Saint Martin la Plaine (FR)

(73) Assignees: COMPAGNIE GENERAL DES ETABLISSISIEMENTS MICHELIN CLERMONT-FERRAND, FRANCE, Clermont-Ferrand (FR); ASSOCIATION POUR LA RECHERCHE DEVELOPPEMENT DES METHODES ET PROCESSUS INDUSTRIELS-A.R.M.IN.E.S., Paris (FR); ECOLE NATIONALE D'INGENIEURS DE SAINT ETIENNE SAINT ETIENNE, FRANCE, Saint Etienne (FR); DMA LASER, St Martin La Plaine (FR)

( * ) Notice: Subject to any disclaimer, the term of this patent is extended or adjusted under 35 U.S.C. 154(b) by 519 days.

(21) Appl. No.: 15/766,823

(22) PCT Filed: Oct. 6, 2016

(86) PCT No.: PCT/FR2016/052585
§ 371 (c)(1),
(2) Date: Apr. 8, 2018

(87) PCT Pub. No.: WO2017/060640
PCT Pub. Date: Apr. 13, 2017

(65) Prior Publication Data
US 2018/0297260 A1    Oct. 18, 2018

(30) Foreign Application Priority Data
Oct. 8, 2015  (FR) ...................................... 1559587

(51) Int. Cl.
*B23K 26/34* (2014.01)
*B23K 35/30* (2006.01)
(Continued)

(52) U.S. Cl.
CPC ............ *B29C 48/509* (2019.02); *B23K 26/34* (2013.01); *B23K 35/3086* (2013.01);
(Continued)

(58) Field of Classification Search
CPC ....... B29C 45/60; C22C 38/002; C22C 38/02; C22C 38/46; C23C 24/103;
(Continued)

(56) References Cited

U.S. PATENT DOCUMENTS 4,822,415 A * 4/1989 Dorfman ................. C22C 38/12
420/35
5,968,603 A * 10/1999 Urbanek ................. B29C 45/60
427/448
(Continued)

FOREIGN PATENT DOCUMENTS

DE       4130207 A1    3/1993
EP       2743361 A1 *  6/2014 ............. C22C 38/58
(Continued)

OTHER PUBLICATIONS

Leunda J et al: "Laser Cladding of Vanadium-Carbide Tool Steels for Die Repair," Physics Procedia, vol. 12, Dec. 31, 2011 (Dec. 31, 2011), pp. 345-352, XP028379978.

(Continued)

*Primary Examiner* — Daniel J. Schleis
*Assistant Examiner* — Kevin CT Li
(74) *Attorney, Agent, or Firm* — Dickinson Wright PLLC

(57) ABSTRACT

A subject of the invention is a process for surfacing or resurfacing a metal part by laser-assisted deposition of a filler material in order to produce an abradable coating of the part, the process being characterized in that the filler material is an iron-based powder comprising vanadium, chromium, nickel, boron, silicon and carbon, in that the laser has an operational wavelength ranging from 900 nm to 1100 nm and in that it comprises the irradiation of the part by a laser beam such that the specific energy (SE) varies from 5 J/mg to 10 J/mg and such that the linear density (LD) varies from 25 mg/mm to 55 mg/mm. Another subject of the invention is the surfaced or resurfaced metal part. Another subject of the invention is a pre-alloy in iron-based powder form, comprising vanadium, chromium, nickel, boron, silicon and carbon.

20 Claims, 5 Drawing Sheets

(51) Int. Cl.
*B23K 35/32* (2006.01)
*C22C 38/46* (2006.01)
*C22C 38/02* (2006.01)
*C22C 38/00* (2006.01)
*B29C 48/505* (2019.01)
*B29C 48/68* (2019.01)
*C23C 24/10* (2006.01)
*B29C 45/60* (2006.01)
*B23K 103/04* (2006.01)
*B23K 101/20* (2006.01)

(52) U.S. Cl.
CPC ........ *B23K 35/3093* (2013.01); *B23K 35/327* (2013.01); *B29C 45/60* (2013.01); *B29C 48/6803* (2019.02); *C22C 38/002* (2013.01); *C22C 38/02* (2013.01); *C22C 38/46* (2013.01); *C23C 24/103* (2013.01); *B23K 2101/20* (2018.08); *B23K 2103/04* (2018.08); *B29C 48/507* (2019.02); *B29C 48/6801* (2019.02)

(58) Field of Classification Search
CPC ............ B23K 35/3086; B23K 35/3093; B23K 35/327; B23K 26/34; B23K 2101/20; B23K 2103/04
See application file for complete search history.

(56) References Cited

U.S. PATENT DOCUMENTS 8,765,052 B2 * 7/2014 Wallin ............... B23K 35/0266
420/12
2008/0145649 A1 * 6/2008 Mannem ................. C23C 30/00
428/336

FOREIGN PATENT DOCUMENTS

JP S6475653 A 3/1989
WO WO-2014127062 A2 * 8/2014 ............... C22C 1/10

OTHER PUBLICATIONS

International Search Report for PCT/FR2016/052585 dated Dec. 20, 2016.
French Search Report regarding French Application No. FR 1559587 dated Aug. 8, 2016.

* cited by examiner

SURFACING PROCESS, SURFACED OR RESURFACED METAL PART

This application is a 371 national phase entry of PCT/EP2016/052585, filed 6 Oct. 2016, which claims benefit of French Patent Application No. 1559587, filed 8 Oct. 2015, the entire contents of which are incorporated herein by reference for all purposes.

BACKGROUND

1. Technical Field

The invention relates to a process for surfacing or resurfacing a metal part, a surfaced or resurfaced metal part, and a pre-alloy in powder form.

A subject of the invention is a process for surfacing or resurfacing a metal part by laser-assisted deposition of a filler material, in order to produce an abradable coating of the part. The invention is more specifically situated within the use of extruders, or expellers, or internal mixers or open mills, which are commonly used for processing or drying or plasticizing or profiling elastomer-based products, intended, inter alia, for the production of tyre preforms. The elastomer-based products may comprise abrasive and corrosive mineral particles which lead to wearing of the screw and of the barrel of the extruder. Various types of contact are encountered: metal/cold gum, metal/hot gum, metal/metal.

2. Related Art

The following section provides a summary of related art which is not necessarily prior art. The metal materials from which these different families of tools are made must meet all criteria in terms of economy, technical performance and service life. Processing of materials or elastomers with a high modulus or which are heavily loaded significantly accelerates significantly the loss of performance of the machine, following premature wearing of some components, the service life of which may, in extreme cases, be reduced to a few months. The tools are also subject to the abrasive effects of the reinforcing filler of the elastomer material. These hard particles erode the metal of the tools.

In the field of extruders and expellers, following contact of the screw in its barrel, damage by creep or adhesion of the material of a component with respect to its antagonist is also observed. The extrusion screws or the rotors or the cylinders of such machines must transmit a high torque to the elastomers in order to ensure their processing.

The mechanical characteristics of the base metal of these parts must not be degraded by a localized hardening operation following work-hardening, which may lead to cracking in the case of metal/metal contact.

It is already known to seek to overcome these problems by surfacing or resurfacing the periphery of these tools, either with hard materials deposited by a technique leading to dilution of a portion of the part to be resurfaced, or with a heat-sprayed material which does not cause dilution, or with a superficial surface-hardening treatment by work-hardening without deposition of material. Coatings welded by resurfacing of the MIG (Metal Inert Gas)/MAG (Metal Active Gas), PTA (Plasma Transferred Arc) or TIG (Tungsten Inert Gas) type or using electric arc welding and laser (Light Amplification by Stimulated Emission of Radiation) cause a rise in the temperature of the screw which may reach, or even exceed, its tempering temperature (over-tempering) and thereby cause a reduction in the mechanical strength (softening phenomenon). They therefore generate a more or less large dilution zone of the substrate, combined with weakening of the hardness of the over-tempering zone close to the substrate/resurfacing interface.

Another method permits the use of resurfacings (or coatings) by high-speed heat spray of the HVOF (High Velocity Oxy-Fuel, Supersonic Flame Spray) or detonation gun or cold-spray welding type, or else by PVD (Physical Vapour Deposition) or CVD (Chemical Vapour Deposition) vapour phase metallization. The advantage of these methods is the small rise in temperature of the substrate and therefore a small loss of mechanical strength of the part to be resurfaced. On the other hand, the attachment of the coating to the substrate occurs by mechanical anchoring and embedding, and not by melting. For this reason, the attachment of the sprayed material to the substrate is reduced.

There is also a possibility of superficial surface-hardening by laser shock, shot peening or roller burnishing. These hardening methods have the essential characteristic of generating a surface which has a very high hardness, but most commonly over a small depth of a few microns to a few tenths of a millimetre. This small thickness of the hard layer is prohibitive for application in extrusion, since it generates high sensitivity of the process to flaking.

SUMMARY

A subject of the invention is a process for surfacing or resurfacing an iron-based metal part by laser-assisted deposition of a filler material in order to produce an abradable coating of the part, the process being characterized in that the filler material is a powder having the following elemental composition:

TABLE 1

| Element | % by weight relative to the total weight of the powder |
|---|---|
| C | 0.3-2.5 |
| Si | 1.5-3.0 |
| B | 0.1-3.5 |
| Ni | 3.5-5.5 |
| Cr | 5-17 |
| V | 10-17.5 |
| Fe | >50% and q.s. 100% | in that the laser has an operational wavelength ranging from 900 nm to 1100 nm and in that it comprises the irradiation of the part by a laser beam such that the specific energy (SE) varies from 5 J/mg to 10 J/mg and such that the linear density (LD) varies from 25 mg/mm to 55 mg/mm.

The powder is advantageously a mixture of two powders:

a. an Fe-based melt metal powder P1, of the following composition:

TABLE 2

| Element | % by weight relative to the total weight of the powder P1 |
|---|---|
| C | 0.3-3 |
| Si | 2-3.0 |
| B | 2.5-4.0 |
| Ni | 4.0-6.0 |
| Cr | 12-16 |
| Fe | >50 and q.s. 100% | b. and a refractory and hard ceramic powder P2, of the following composition:

TABLE 3

| Element | % by weight relative to the total weight of the powder P2 |
|---|---|
| C | 10-20 |
| V | 80-90 |

When the powder is a mixture of a powder P1 and a powder P2, the powder comprises 10% to 30% by weight of P2 and, respectively, 90% to 70% by weight of P1, relative to the total weight of the mixture of the two powders P1+P2.

Characteristics of the Process:

The pitch, also referred to as hatch spacing, advantageously varies from 2 mm to 4 mm, and the covering ratio advantageously varies from 50% to 65%.

The specific energy (SE) advantageously varies from 8 J/mg to 11 J/mg or from 5 J/mg to 8 J/mg and the linear density (LD) of the deposition advantageously varies from 30 mg/mm to 50 mg/mm.

The laser spot advantageously has a diameter (Øl) varying from 4 mm to 7 mm, more advantageously of 5 mm±5%.

The invention also relates to a surfaced or resurfaced metal part, comprising:

an iron-based substrate, an abradable coating, deposited on said substrate, containing:

more than 50% by volume of an Fe-based matrix, less than 50% by volume of refractory and hard phases, the coating comprising the following elements:

TABLE 4

| Element | % by weight relative to the total weight of the coating |
|---|---|
| C | 0.3-2.5 |
| Si | 1.5-3.0 |
| B | 0.1-3.5 |
| Ni | 3.5-5.5 |
| Cr | 5-17 |
| V | 10-17.5 |
| Fe | >50% and q.s. 100% | and a heat-affected zone (HAZ) in the substrate, at the substrate/coating interface, with a thickness of less than 2 mm.

The coating advantageously has a thickness varying from 0.5 mm to 1.2 mm after rectification.

The coating advantageously has an average hardness of greater than 750 $HV_{0.2}$, in particular greater than 770 $HV_{0.2}$, in particular greater than 800 $HV_{0.2}$, in particular greater than 850 $HV_{0.2}$.

The heat-affected zone advantageously has a thickness of less than 1.5 mm, in particular less than or equal to 1.2 mm.

The part is advantageously an extrusion cylinder (barrel), the coating being deposited by resurfacing a portion of a concave face of the cylinder.

The part is advantageously an extrusion screw, the coating being deposited by resurfacing the crown wall of at least one raised part of the extrusion screw.

Another subject of the invention is a pre-alloy in powder form, having the following elemental composition:

TABLE 1

| Element | % by weight relative to the total weight of the powder |
|---|---|
| C | 0.3-2.5 |
| Si | 1.5-3.0 |
| B | 0.1-3.5 |
| Ni | 3.5-5.5 |
| Cr | 5-17 |
| V | 10-17.5 |
| Fe | >50% and q.s. 100% |

DESCRIPTION OF THE MEASUREMENT METHODS AND DEFINITIONS

Particle Size Analysis

Figure 1:
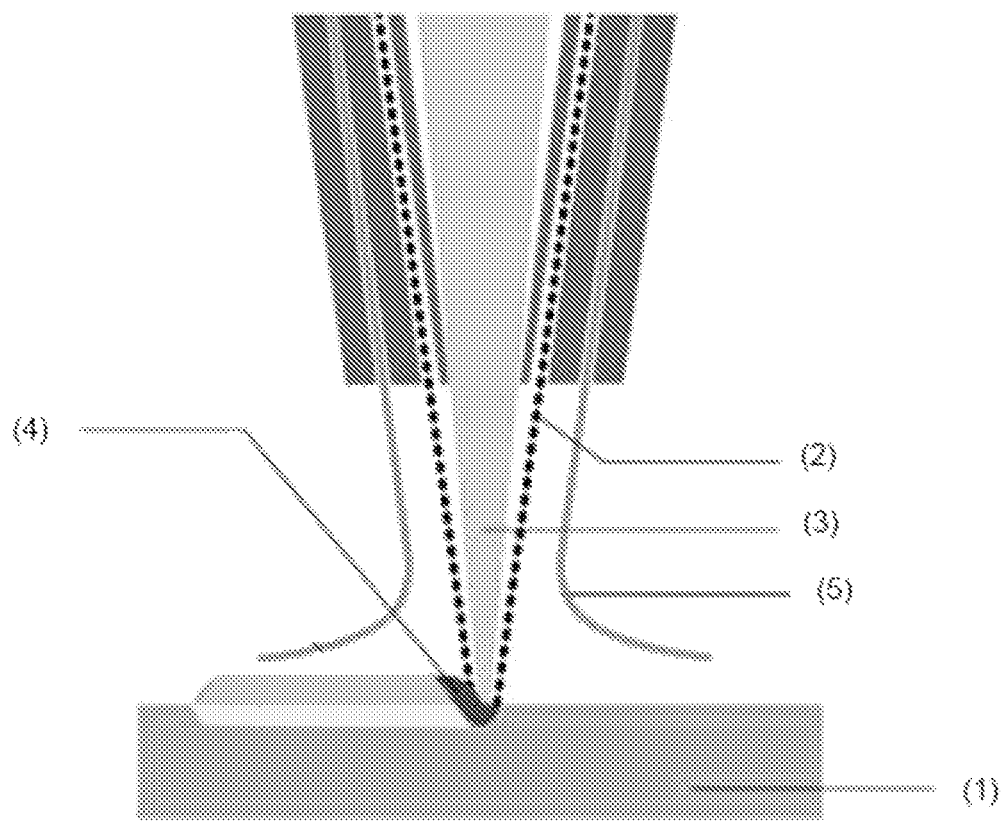
FIG. 1: laser resurfacing device with coaxial supply of material.

In the present description, the size of the powder particles is expressed as median diameter by volume, d(V; 0.5), denoted d50, which represents the diameter for which 50% (by volume) of the particles of the powder have a diameter greater than (or, equivalently, less than) this value.

The particle size of the powder is analysed with an optical granulo-morphometer by image analysis: ALPAGA 500 NANO (At Line Particle Acquisition for Granulo-morphometric Analysis).

Principle: A vacuum dispersion apparatus makes it possible to deposit and disperse the powder on a glass slide. This glass slide passes under collimated monochromatic light and an optical system (telecentric lenses); the images are subsequently processed by image analysis software.

Vickers Hardness

For the hardness measurements, a pyramid-shaped indenter (or penetrator) is used. The pyramid is made of diamond and has a square base applied with a force F. The length of the two diagonals of the indentation ($d_1$ and $d_2$) is measured, then the mean thereof is calculated $d=(d_1+d_2)/2$. The Vickers hardness HV is given by:

$$HV=1.854\times(0.102\ F/d^2)=0.189\ F/d^2;$$

F is expressed in Newtons and d in mm.

Vickers hardness is denoted $HV_x$, where x is the force applied in Newtons multiplied by 0.102 (i.e. the load in kgf).

Thus, $HV_{0.1}$ and $HV_{0.2}$ denote the Vickers hardness for a force of 100 gf or 200 gf, respectively.

The pitch (the distance) between the indentations is 0.2 mm. A filiation is then carried out, that is to say a succession of indentations spaced apart by 0.2 mm, starting from the top of the resurfacing as far as into the substrate.

The internal porosity of the powders is measured by means of a gas pycnometer.

Definitions

"Specific energy", denoted SE, denotes, for the purposes of the invention, the ratio of the laser power (P) to the mass flow rate of powder (Mf), i.e. SE=P/Mf, and is commonly expressed in J/mg.

"Linear density", denoted LD, denotes, for the purposes of the invention, the ratio of the mass flow rate of powder (Mf) to the laser scanning speed (V), i.e. LD=Mf/V, and is commonly expressed in mg/mm.

Linear energy, denoted LE, corresponds to the specific energy×the linear density (LE=SE×LD).

"Pitch" or "hatch spacing" denotes, for the purposes of the invention, the distance between two juxtaposed laser marks.

"Covering ratio" ($\tau_R$), is calculated by the formula $\tau_R$=(L−pitch)/L, where L is the width of the bead. The values L and pitch are expressed in the same units, for example in mm. Reference will be made to refractory and hard "particles" for the ceramic powder P2 of the filler metal, and to refractory and hard "phases" for the coating obtained, which phases serve as reinforcing phases which, moreover, are much finer than the particles of the ceramic powder.

A particle or a phase is "refractory" for the purposes of the present invention when the melting point of the material composing same is greater than 1800° C., advantageously greater than 2000° C.

A particle is "hard" when its Vickers hardness is greater than 800 HV, advantageously greater than 1000 HV.

The expression "vanadium carbide" is intended to denote, for the purposes of the present invention, vanadium carbides regardless of their stoichiometry (in particular VC and $V_2C$).

The "powder", for the purposes of the present invention, denotes either a single powder (a pre-alloy) or a mixture of several (melt and refractory) powders, separated from one another (no intimate mixing) or kept with one another (agglomerated).

"Pre-alloy in powder form" denotes a completely alloyed powder, generally obtained by atomization of the molten alloy as defined by standard ISO 3252:1999.

"Q.s." means "quantum sufficit", i.e. sufficient amount for.

An iron-based metal substrate is a substrate comprising more than 50% by weight of iron relative to the total weight of the substrate.

Steel may be defined as a material essentially composed of iron and having a carbon content of less than 2% by weight. It may further contain other elements. If more than 0.5% by weight of alloying elements are added to the steel, reference is made to alloy steel. If the content of these alloying elements remains less than 5% by weight, then reference is made to low-alloy steel, and if at least one of these alloying elements has a content of greater than 5% by weight, then reference is made to high-alloy steel. The term "alloy steel" denotes low- and high-alloy steels, for example stainless steels.

The equivalent carbon content (CE) is calculated according to the formula of the International Institute of Welding (IIW), i.e.: CE=C+Mn/6+(Cr+Mo+V)/5+(Ni+Cu)/15, with C, Mn, Cr, Mo, V, Ni and Cu representing the percentage by weight of each of these elements in the steel.

"Sphericity" is intended to mean the sphericity factor (a dimensionless number) as defined by Wadell as follows: the ratio of the surface area of the sphere with the same volume as the particle to the surface area of the particle in question ($\Psi v$), also equivalent to the square of the ratio of the volume-equivalent diameter to the surface-equivalent diameter. A sphericity of 0.8 corresponding to a cube, and a sphericity of 1.0 corresponding to a sphere.

"Form factor" is intended to mean the ratio between the maximum Feret diameter (maximum distance between two parallel tangents on opposite sides of the particle) and the minimum Feret diameter (minimum distance between two parallel tangents on opposite sides of the particle). This form factor makes it possible to give a good indication of the slenderness of the particles. A form factor equal to 1 corresponds to a sphere. A form factor equal to $\sqrt{2}$ corresponds to a cube.

DETAILED DESCRIPTION OF EXAMPLE EMBODIMENT

The invention proposes a novel pairing of material/resurfacing process, making it possible to obtain a hard abradable coating, the hard phases of which are small and uniformly distributed in the coating, which is particularly suitable for this type of tools, used in a field which has very severe conditions of use, while making the performance of these surfaced or resurfaced tools long-lasting, both for the new material and over the longer term, when re-standardized. The resurfacing coating of the present invention thus has good resistance to wear by abrasion and, moreover, due to the fineness of the microstructure, affords uniform wearing.

A subject of the invention is a process for surfacing or resurfacing a metal part by laser-assisted deposition of a filler material in order to produce an abradable coating of the part, the process being characterized in that the filler material is a powder having the following elemental composition:

TABLE 1

| Element | % by weight relative to the total weight of the powder |
| --- | --- |
| C | 0.3-2.5 |
| Si | 1.5-3.0 |
| B | 0.1-3.5 |
| Ni | 3.5-5.5 |
| Cr | 10-17 |
| V | 10-17.5 |
| Fe | >50% and q.s. 100% | in that the laser has an operational wavelength ranging from 900 nm to 1100 nm and in that it comprises the irradiation of the part by a laser beam such that the specific energy (SE) varies from 5 J/mg to 10 J/mg and such that the linear density (LD) varies from 25 mg/mm to 55 mg/mm.

A diagram of the principle of laser resurfacing with supply of material is represented in FIG. 1.

In this figure, the metal substrate (1) is irradiated by a laser beam (3) and a jet of powder conveyed by a carrier gas (2) is sprayed through a coaxial nozzle, that is to say in the axis of the laser beam. The filler material is partially melted during its passage into the laser beam, and it forms a molten pool (4) at the surface of the substrate. The pool is protected locally under neutral gas (5), such as argon, helium or argon-helium mixtures.

Filler Material

The powder has the elemental composition given in table 1.

Iron is the predominant element and will constitute the phase referred to as "melt". The elements boron and silicon make it possible to lower the melting point thereof.

The powder comprises from 10% by weight to 17% by weight, advantageously from 10% to 15% by weight, relative to the total weight of the powder, of Cr element such that the coating is corrosion-resistant.

The powder also comprises nickel which is a gammagenic element and ensures good ductility and, combined with chromium, guarantees high depth of hardening.

The filler material also comprises refractory and hard particles, which are advantageously vanadium carbides.

The filler material also comprises carbon, which may be in the form of free carbon at the surface of the vanadium carbides.

The filler material is in pulverulent form. The powder may be a single powder, a mixture of several separate powders or a mixture of agglomerated powders.

The filler material advantageously comprises an iron-based metal melt powder and a refractory and hard powder. The refractory powder is also referred to as "reinforcer".

In particular, the filler material is a mixture
a. of an Fe-based melt metal powder P1, of the following composition:

TABLE 2

| Element | % by weight relative to the total weight of the powder P1 |
|---|---|
| C | 0.3-3 |
| Si | 2-3.0 |
| B | 2.5-4.0 |
| Ni | 4.0-6.0 |
| Cr | 12-16 |
| Fe | >50 and q.s. 100% | b. and of a refractory and hard ceramic powder P2, of the following composition:

TABLE 3

| Element | % by weight relative to the total weight of the powder P2 |
|---|---|
| C | 10-20 |
| V | 80-90 |

In this variant, the filler material is a powder which advantageously comprises 10% to 30% by weight of powder P2 and, respectively, 90% to 70% by weight of powder P1, relative to the total weight of the mixture of the two powders P1+P2. The mixture of powders advantageously comprises 10% to 20% by weight of powder P2 and, respectively, 90% to 80% by weight of powder P1, relative to the total weight of the mixture of the two powders P1+P2.

The single powder or each of the two powders of the mixture advantageously have a d50 ranging from 40 μm to 70 μm, more advantageously from 45 μm to 55 μm.

For better uniformity of the beam of powders, the two powders P1 and P2 of the mixture must have a relatively close particle size distribution.

For a better flow of the powder or of the mixture of powders through the dispenser and the nozzle, the powder(s) is (are) advantageously spherical, with a sphericity of between 0.8 and 1.0 and a form factor of between 1 and √2.

The ceramic powder P2 advantageously has a Vickers hardness varying from 2000 $HV_{0.1}$ to 3000 $HV_{0.1}$, more advantageously from 2200 $HV_{0.1}$ to 2800 $HV_{0.1}$. This ceramic powder P2 preferably has a particle size such that d50 varies from 40 μm to 70 μm, advantageously from 45 μm to 55 μm. In a particular method of production, 63 μm sieving of the mixture is carried out.

In a particular method of production, the powder P2 is spherical, advantageously with a sphericity of between 0.8 and 1.0 and a form factor of between 1 and √2.

Advantageously, the internal porosity of the powder P2 does not exceed 1.0%, more advantageously 0.5% and at best 0.2%.

The iron-based melt powder P1 advantageously has a Vickers hardness varying from 800 $HV_{0.2}$ to 1400 $HV_{0.2}$, more advantageously from 950 $HV_{0.2}$ to 1250 $HV_{0.2}$.

Advantageously, the internal porosity of the powder P1 does not exceed 1.0%, more advantageously 0.5% and at best 0.2%.

Advantageously, the proportion of refractory powder P2 may be entirely redissolved in the metal powder P1 during the passage thereof into the liquid phase, following interaction with the laser beam. Thus, it is possible to dissolve the refractory powder comprising the carbides, without melting it, into the liquid melt.

Consequently, instead of using a mixture of two powders, a metal powder and a ceramic powder, it can also be envisaged to prepare a pre-alloy, in the desired proportions by weight, by dissolving the elements of the ceramic powder in the solution of the metal powder. This pre-alloy will subsequently advantageously be atomized to prepare a single, spherical powder.

The powder of the filler material advantageously has a solidification range varying from 250° C. to 400° C., more advantageously from 250° C. to 300° C.

The iron-based melt metal powder and the ceramic powder are commercially available either separately or already mixed.

Substrate

The metal part to be resurfaced is an iron-based substrate. The metal part to be resurfaced is advantageously made of steel, of alloy steel or of cast iron. The metal part advantageously has an equivalent carbon content, CE, of less than 0.80.

The metal part to be resurfaced may most particularly be made of annealed 15CDV6 steel, in particular hardened 15CDV6 or 15CDV6 in a quenched then tempered state.

Resurfacing Process

The process according to the invention is characterized in that the specific energy (SE) varies from 5 J/mg to 10 J/mg and in that the linear density (LD) varies from 25 mg/mm to 55 mg/mm.

The specific energy more advantageously varies from 8 J/mg to 11 J/mg or from 5 J/mg to 8 J/mg.

The linear density advantageously varies from 30 mg/mm to 50 mg/mm.

The pitch, also referred to as hatch spacing, advantageously varies from 2 mm to 4 mm, more advantageously from 2.5 mm to 4 mm, even more advantageously from 2.5 mm to 3.5 mm. The width of the bead advantageously varies from 4 mm to 8 mm, more advantageously from 5 mm to 7 mm, even more advantageously from 5.5 mm to 6.5 mm. The covering ratio advantageously varies from 50% to 65%, more advantageously from 55% to 60%.

Advantageously, the deposition of a single layer is sufficient.

These conditions enable the application of a coating of uniform hardness, which is sufficiently thick but which does not have any cracks which will damage the future mechanical properties. Indeed, the resurfacing coating has a uniform hardness (hard phases of very small sizes and distributed uniformly) and therefore uniform wear, unlike certain resurfacing materials for which the hard phases are large in size.

These conditions also enable the juxtaposition of several beads next to one another over a relatively regular and flat thickness.

The laser advantageously has an operational wavelength ranging from 900 nm to 1100 nm. Such a laser may for example be an Nd:YAG laser with an operational wavelength of 960 nm.

The laser spot advantageously has a diameter varying from 4 mm to 7 mm, more advantageously of 5 mm±5%.

Advantageously, at least one of the following conditions is met:
  a. the ratio of the power of the laser beam to the scanning speed of the laser beam varies from $2\times10^5$ kg·m·s$^{-2}$ (200 J/mm) to $4\times10^5$ kg·m·s$^{-2}$ (400 J/mm);
  b. the ratio of the power of the laser beam to the scanning speed of the laser beam varies from $2.5\times10^5$ kg·m·s$^{-2}$ (250 J/mm) to $3.5\times10^5$ kg·m·s$^{-2}$ (350 J/mm), preferably is substantially equal to $3\times10^5$ kg·m·s$^{-2}$ (300 J/mm);
  c. the ratio of the mass flow rate of powder to the scanning speed of the laser beam is between 25 and 55 mg·mm$^{-1}$, advantageously between 30 and 50 mg·mm$^{-1}$;
  d. the scanning speed of the laser beam varies from 2 mm·s$^{-1}$ (120 mm/min) to 20 mm·s$^{-1}$ (1200 mm/min), in particular from 5 mm·s$^{-1}$ (300 mm/min) to 13.33 mm·s$^{-1}$ (800 mm/min);
  e. the laser beam has a power varying from 1 kW to 5 kW, in particular from 1.5 kW to 4 kW;
  f. the mass flow rate of powder varies from 10 g·mm$^{-1}$ to 40 g·mm$^{-1}$, in particular from 14 g·mm$^{-1}$ to 26 g·mm$^{-1}$.

More advantageously, all these conditions are met.

In a first variant,
  the linear density varies from 43 mg/mm to 50 mg/mm
  the specific energy varies from 6 J/mg to 7 J/mg
  the hatch spacing is 3 mm or 3.5 mm
  the covering ratio varies from 55% to 60%
  the spot diameter is 5 mm.

Advantageously, the laser is an Nd:YAG laser and the following operating conditions are met:
  the scanning speed of the laser beam varies from 3 mm·s$^{-1}$ (180 mm/min) to 7 mm·s$^{-1}$ (420 mm/min);
  the power of the laser beam varies from 1 kW to 2 kW; and
  the mass flow rate of powder varies from 10 g·mm$^{-1}$ to 20 g·mm$^{-1}$.

In a second variant,
  the linear density varies from 29 mg/mm to 36 mg/mm
  the specific energy varies from 8.5 J/mg to 10 J/mg
  the hatch spacing is 3 mm or 3.5 mm
  the covering ratio varies from 55% to 60%
  the spot diameter is 5 mm.

Advantageously, the laser is an Nd:YAG laser and the following operating conditions are met:
  the scanning speed of the laser beam varies from 10 mm·s$^{-1}$ (600 mm/min) to 15 mm·s$^{-1}$ (900 mm/min);
  the power of the laser beam varies from 3 kW to 5 kW; and
  the mass flow rate of powder varies from 20 g·mm$^{-1}$ to 30 g·mm$^{-1}$.

The powder is advantageously conveyed by helium (carrier gas). The irradiation zone is advantageously protected by a protective gas, advantageously argon.

By the process according to the invention, a coating having the desired properties may be obtained by spraying a single layer. Thus, in the process, advantageously one layer is applied.

It is moreover possible to heat or pre-heat the metal part during the resurfacing step and, if possible, below the targeted tempering temperature. Advantageously, no pre-heating is carried out.

The heating means may be any suitable means, especially the spraying laser, an inductor, or a pre-heating oven. When pre-heating is carried out, the pre-heating temperature varies for example from 350° C. to 600° C., advantageously from 400° C. to 550° C.

Abradable Coating Obtained

The coating obtained, deposited and metallurgically bonded to the iron-based substrate, will also comprise an iron-based matrix, but also refractory and hard phases.

The coating contains:
  more than 50% by volume of an Fe-based matrix
  less than 50% by volume of refractory phases.

The coating advantageously comprises the following elements:

TABLE 4

| Element | % by weight relative to the total weight of the coating |
|---|---|
| C | 0.3-2.5 |
| Si | 1.5-3.0 |
| B | 0.1-3.5 |
| Ni | 3.5-5.5 |
| Cr | 5-17 |
| V | 10-17.5 |
| Fe | >50% and q.s. 100% |

The matrix advantageously comprises the following elements: Fe, Cr, Si, Ni, and optionally traces of V, C, B and traces of alloy elements from the substrate which belong neither to the melt nor to the filler material.

The proportion of refractory and hard phases in the coating advantageously varies from 15% to 50% by volume relative to the total volume of the coating.

The refractory and hard phases advantageously comprise vanadium carbides, the stoichiometry of which may vary broadly, and borides, in particular chromium borides. The vanadium carbides are most commonly of equiaxed form. The vanadium carbides may contain larger or smaller amounts of chromium. Indeed, the vanadium carbides of the filler material are redissolved during the resurfacing, and the chromium atoms optionally present in the filler material, which are elements that are very close to vanadium in terms of atomic radius, may be inserted into the crystalline structure of the vanadium carbides. These vanadium carbides advantageously have a size varying from 1 μm to 5 μm, more advantageously less than or equal to 2 μm.

The refractory and hard phases of the coating also comprise borides, in particular chromium borides. The chromium borides are more or less star-shaped. These borides may contain the element vanadium, which will have been inserted into the crystalline structure during the dissolving of the refractory powder in the liquid melt.

These borides advantageously have a size varying from 3 μm to 15 μm, more advantageously varying from 8 μm to 12 μm.

The refractory and hard phases are distributed homogeneously in the matrix.

The coating obtained advantageously has an average hardness of greater than 750 $HV_{0.2}$, in particular greater than 770 $HV_{0.2}$, in particular greater than 800 $HV_{0.2}$, in particular greater than 850 $HV_{0.2}$. The coating obtained advantageously has an average hardness of less than 1200 $HV_{0.2}$. More particularly, the coating obtained advantageously has an average hardness ranging from 750 $HV_{0.2}$ to 1200 $HV_{0.2}$, more advantageously from 750 $HV_{0.2}$ to 1000 $HV_{0.2}$, more advantageously from 750 $HV_{0.2}$ to 950 $HV_{0.2}$.

An advantage of the process according to the present invention is that, during its deposition, the refractory particles of the filler material will be dissolved, that is to say put into solution, after the melting of the melt. A coating is thus obtained with uniform thickness and a fine and uniform microstructure, in particular regarding the distribution and size of the refractory and hard phases which precipitate within the coating.

Another significant advantage of this process is that the thickness of the heat-affected zone is very small. Thus, in the substrate, the heat-affected zone advantageously has a thickness of less than 2 mm, in particular less than or equal to 1.5 mm, more particularly less than or equal to 1.2 mm.

The thickness of the diluted zone forming the substrate/coating interface is advantageously less than 250 µm. The thickness of this diluted zone is at least the thickness necessary to ensure bonding (advantageously at least 30 µm), but is kept as low as possible in order to avoid dilution of the substrate and avoid the appearance in the coating of metal elements originating from the substrate. The thickness of the diluted zone advantageously varies from 3% of the thickness of the coating deposited, before rectification, to 5% of the thickness of the coating deposited, before rectification.

At the end of the process, the coating has a thickness advantageously varying from 1.0 mm to 3 mm and more particularly from 1.2 mm to 2 mm, in particular from 1.5 mm to 1.8 mm. This thickness advantageously corresponds to the thickness of the single layer deposited. The process may comprise an additional step of rectification of this coating to achieve a desired thickness which varies advantageously from 0.5 mm to 1.2 mm. This thickness advantageously corresponds to the thickness of the single layer deposited.

Surfaced or Resurfaced Metal Part

Another subject of the invention is a surfaced or resurfaced metal part, comprising:
an iron-based substrate, in particular made of steel, of alloy steel or of cast iron,
an abradable coating, deposited on said substrate, containing
more than 50% by volume of an Fe-based matrix
less than 50% by volume of refractory phases,
the coating comprising the following elements:

TABLE 4

| Element | % by weight relative to the total weight of the coating |
|---|---|
| C | 0.3-2.5 |
| Si | 1.5-3.0 |
| B | 0.1-3.5 |
| Ni | 3.5-5.5 |
| Cr | 5-17 |
| V | 10-17.5 |
| Fe | >50% and q.s. 100% | and a heat-affected zone (HAZ) in the substrate, at the substrate/coating interface, with a thickness of less than 2 mm.

The substrate is as described above.

The part is advantageously an extruder part, or expeller part, or internal mixer part, or open mill part. The part is advantageously an extrusion cylinder, the coating being deposited by resurfacing a portion of a concave face of the cylinder. The part is advantageously an extrusion screw, the coating being deposited by resurfacing the crown wall of at least one raised part of the extrusion screw.

The coating is as described above. It advantageously has a thickness varying from 0.5 mm to 1.2 mm after rectification. This thickness advantageously corresponds to the thickness of the single layer deposited.

Another subject of the invention is the resurfaced metal part obtained by the process according to the invention.

The surfaced or resurfaced metal parts according to the invention or obtained by the process according to the invention have the desired properties, in particular:
good wear resistance, the coating having uniform hardness over its entire depth and having few or no cracks, with crack propagation that is difficult or non-critical relative to the orientation of the cracks observed (absence of delamination),
good shear strength, the coating having adhered to the metal part by the formation of a diluted zone of moderate thickness (advantageously less than 250 µm) leading to the creation of a good metallurgic bond in so far as filler material and metal part are metallurgically compatible. Thus, the coating cannot be sheared or entrained during its contact with the plastic gum (rubber or elastomer).

Another subject of the invention is a pre-alloy in powder form, having the following elemental composition:

TABLE 1

| Element | % by weight relative to the total weight of the powder |
|---|---|
| C | 0.3-2.5 |
| Si | 1.5-3.0 |
| B | 0.1-3.5 |
| Ni | 3.5-5.5 |
| Cr | 5-17 |
| V | 10-17.5 |
| Fe | >50% and q.s. 100% |

The powder advantageously comprises from 10% to 15% by weight, relative to the total weight of the powder, of element Cr.

This pre-alloy powder may especially be prepared by dissolving, by heating, without melting of a refractory ceramic powder as defined above, in a liquid metal powder, as defined above. The homogeneous liquid thus obtained will then advantageously be atomized to prepare a single, spherical powder.

The powder is advantageously a pre-alloy powder, the particles of which have a sphericity of between 0.8 and 1.0 and a form factor of between 1 and $\sqrt{2}$, each powder particle having a substantially identical mean composition.

Preferably, this sphericity factor is greater than 0.82, advantageously greater than 0.85, and even more advantageously greater than 0.90, with an even more advantageous situation when this sphericity factor is greater than 0.95.

Preferably, this form factor is less than 1.3, advantageously less than 1.25, and even more advantageously less than 1.15, with an even more advantageous situation when this form factor is less than 1.05.

EXAMPLES

The following tests were carried out under the following operating conditions:
Substrate: 15CDV6 alloy steel in annealed state
Resurfacing machine: Nd-YAG laser, TLC7040 from Trumpf, DISK laser: trudisk4001 (4 kW), MSO-LMD head, 5016 nozzle (3 jets at 120°), working distance 16 mm, dual-core optical fibre 100 µm/400 µm.

A powder with the following composition is used (table 5, the percentages are expressed by weight):

TABLE 5

| C | Si | B | Ni | Cr | V | Fe |
|---|---|---|---|---|---|---|
| 1.8 | 2.5 | 2.9 | 4.3 | 11.0 | 12.2 | 65.3 |

Example 1-A

The operating parameters are as follows (table 6):

TABLE 6

| Diameter of the laser beam | Scanning speed of the laser | Laser power | Pitch | Mass flow rate of powder | He flow rate | Ar flow rate | Number of layers | Height of the coating |
|---|---|---|---|---|---|---|---|---|
| mm | mm/min | Watts | mm | rpm | g/min | l/min | l/min | mm |
| 5 | 800 | 4000 | 3 | 4 | 26 | 5 | 10 | 1 | 1.8 |

And thus:
Specific energy (SE): 9.23 J/mg
Linear density (LD): 32.5 mg/mm
Linear energy (LE): 300 J/mm.

A coating with a fine and homogeneous microstructure is obtained, 1.8 mm thick (before rectification) and with an average hardness of 789 $HV_{0.2}$, uniform over the entire depth of the coating.

The coating does not have any cracks unsuitable for the desired future use.

The thickness of the heat-affected zone is 1200 µm.

The coating comprises, as refractory phases, vanadium carbides enriched in chromium, and their sizes do not exceed 2 µm.

Regarding the matrix, three phases may be distinguished:
a solid solution rich in Fe, Cr, Si and Ni with a small amount of B,
arborescent phases rich in Fe and in Si with a small amount of Ni,
two-phase zones, consisting of the combination of two lamellar phases (of geometric and angular forms), most certainly composed of a Cr boride phase and of a phase rich in Fe and Si.

Figure 2:
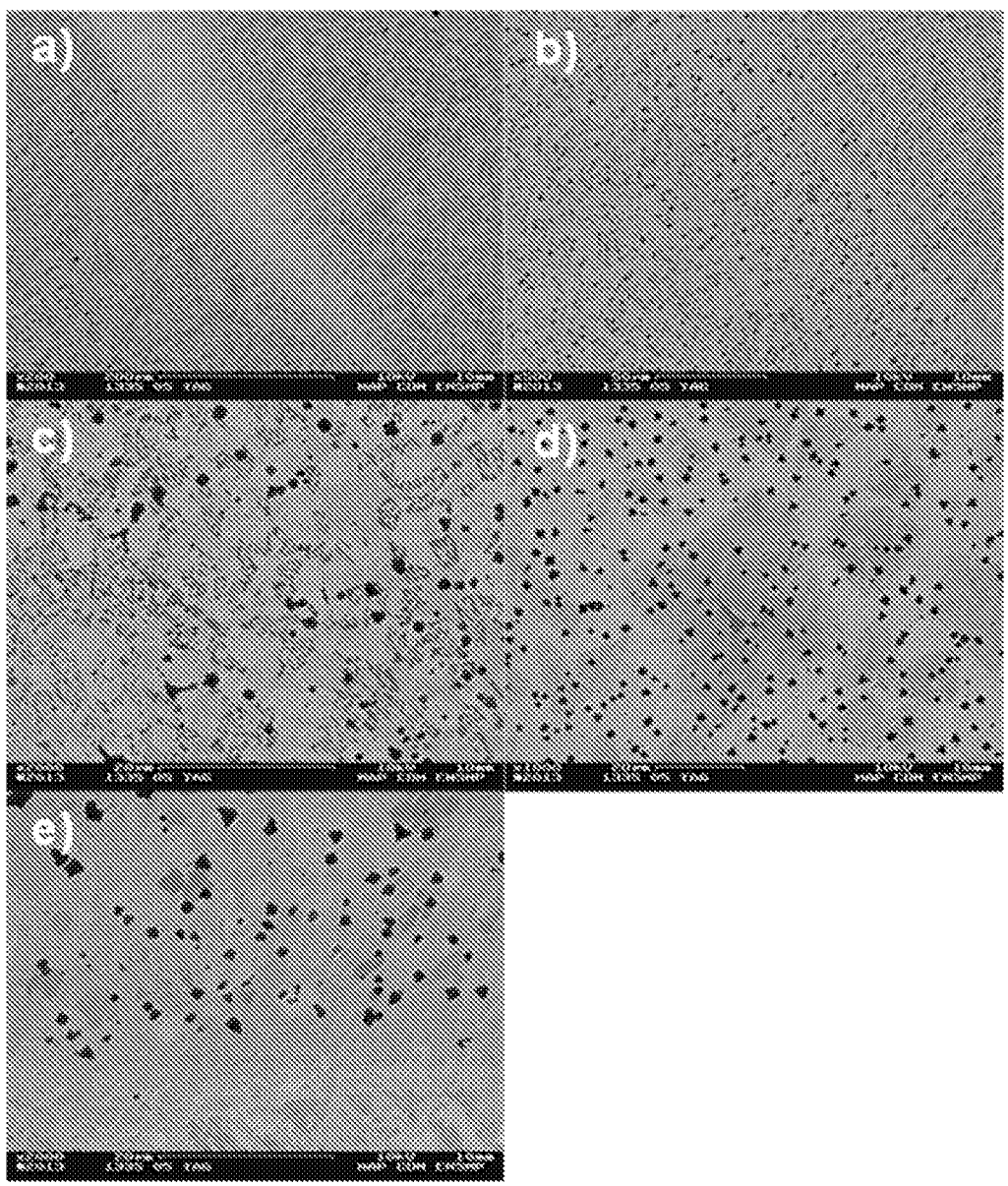
FIG. 2: micrographs, taken with backscattered electron SEM, of the coating from example 1-A: (a) view of a liquid upflow from the substrate into the coating, at magnification ×200, (b) overall view at magnification ×500, (c) view at magnification ×2000, (d) view at magnification ×1000, (e) view of the coating/substrate interface at magnification ×2000.

FIG. 2 represents micrographs, taken with backscattered electron SEM, of the coating from example 1-A: (a) view of a liquid upflow from the substrate into the coating, at magnification ×200, (b) overall view at magnification ×500, (c) view at magnification ×2000, (d) view at magnification ×1000, (e) view of coating/substrate interface at magnification ×2000.

Figure 3:
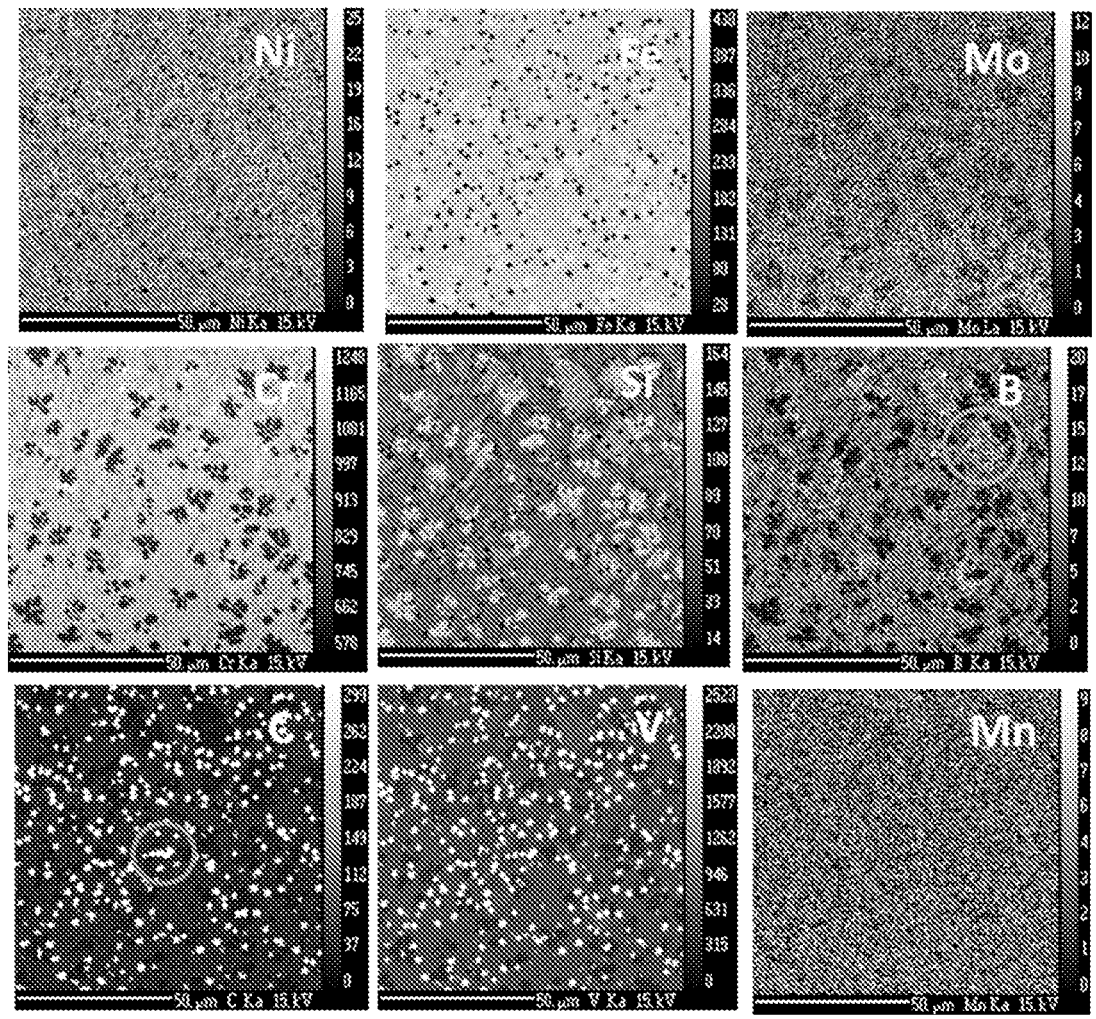
FIG. 3: X-ray mapping of the main chemical elements making up the coating from example 1-A: from the top left-hand side to the bottom right-hand side: Ni, Fe, Mo, Cr, Si, B, C, V, Mn.

FIG. 3 represents X-ray mapping of the main chemical elements making up the coating from example 1-A: from the top left-hand side to the bottom right-hand side: Ni, Fe, Mo, Cr, Si, B, C, V, Mn. On the mapping of the element Si, arborescent phases rich in Fe and Si with a small amount of Ni are circled. On the mapping of the element B, eutectic phases rich in B, Cr, Si and Fe, with the presence of a chromium boride BxCry and a phase rich in Fe and Si, are circled. On the mapping of the element C, vanadium carbides rich in Cr of Cx(V,Cr)y type are circled.

The characteristics of hardness and the dimensional characteristics of the coating, the HAZ and the substrate are reported in the following table 7:

TABLE 7

| | | Load (kg) | Diagonals (µm) | Vickers hardness (kgf/mm²) | Thickness (µm) |
|---|---|---|---|---|---|
| Coating | | 0.2 | 21.7 ± 0.9 | 789 ± 59 | 1800 |
| Heat-affected zone (HAZ) | Close to the coating | 0.2 | 30.8 ± 0.5 | 392 | 1200 |
| | Close to the substrate | | 43.5 ± 0.4 | 197 | |
| Substrate (15CDV6) | | 0.2 | 44 ± 1.2 | 192 ± 10 | — |

Example 1-B

The operating parameters are as follows (table 8):

TABLE 8

| Diameter of the laser beam | Scanning speed of the laser | Laser power | Pitch | Mass flow rate of powder | He flow rate | Ar flow rate | Number of layers | Height of the coating |
|---|---|---|---|---|---|---|---|---|
| mm | mm/min | Watts | mm | rpm | g/min | l/min | l/min | mm |
| 5 | 300 | 1500 | 3 | 2.1 | 14 | 5 | 10 | 1 | 1.8 |

And thus:
Specific energy (SE): 6.43 J/mg
Linear density (LD): 46.7 mg/mm
Linear energy (LE): 300 J/mm.

A coating with a less fine but homogeneous microstructure is obtained, 1.8 mm thick (before rectification) and with an average hardness of 893 $HV_{0.2}$, uniform over the entire depth of the coating.

The coating does not have any cracks which prohibit the desired future use.

The thickness of the heat-affected zone is 1200 μm.

The coating comprises, as refractory phases, vanadium carbides enriched in chromium with sizes not exceeding 2 μm, but it also comprises chromium borides rich in vanadium which are quite large in size (~10 μm), i.e. of a size 5 times bigger than the vanadium carbides.

The matrix is composed:
- of a solid solution rich in Fe, Cr, Si and Ni with a small amount of B,
- of arborescent phases rich in Fe and in Si with a small amount of Ni,
- of two-phase zones, consisting of the combination of two lamellar phases (of geometric and angular forms), most certainly composed of a Cr boride phase and of a phase rich in Fe and Si.

Compared to example 1-A, these two-phase zones are much less abundant in the matrix, but where they are abundant, they are in a much less geometric form.

Figure 4:
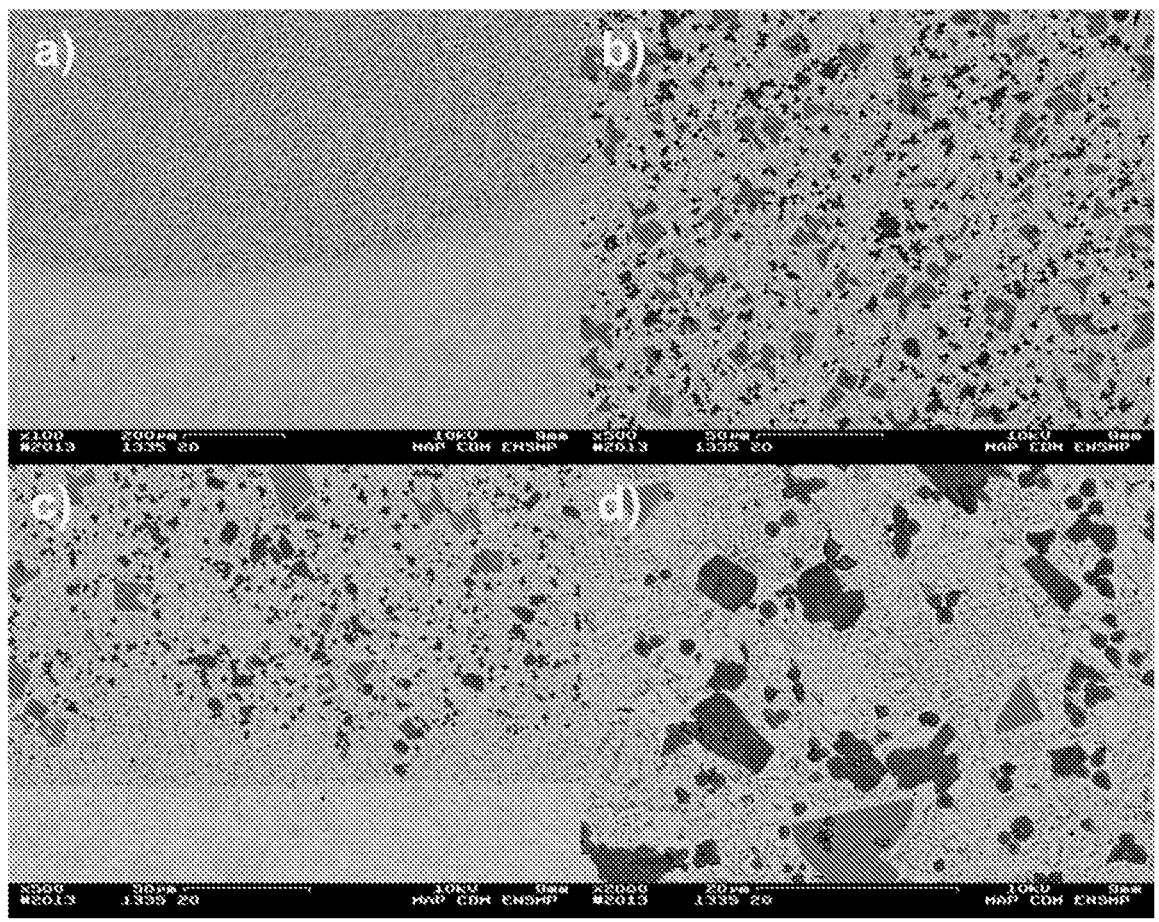
FIG. 4: micrographs, taken with backscattered electron SEM, of the coating from example 1-B: (a) view of the coating/substrate interface at magnification ×100, (b) interior of the coating at magnification ×500, (c) interface at magnification ×500, and (d) interior of the coating at magnification ×2000.

FIG. 4 represents micrographs, taken with backscattered electron SEM, of the coating from example 1-B: (a) view of the coating/substrate interface at magnification ×100, (b) interior of the coating at magnification ×500, (c) interface at magnification ×500, and (d) interior of the coating at magnification ×2000.

Figure 5:
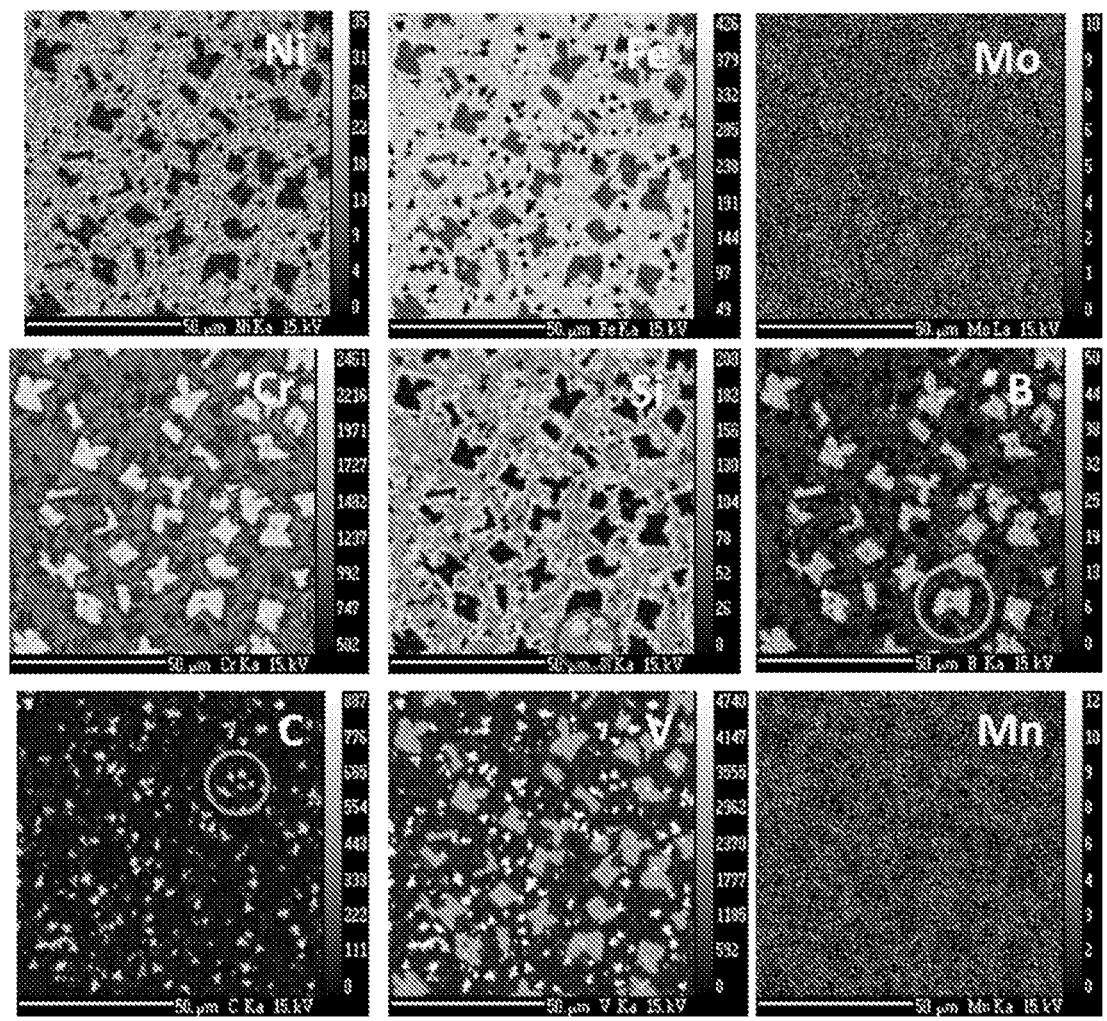
FIG. 5: X-ray mapping of the main chemical elements making up the coating from example 1-B: from the top left-hand side to the bottom right-hand side: Ni, Fe, Mo, Cr, Si, B, C, V, Mn.

FIG. 5 represents X-ray mapping of the main chemical elements making up the coating from example 1-B: from the top left-hand side to the bottom right-hand side: Ni, Fe, Mo, Cr, Si, B, C, V, Mn. On the mapping of the element Si, arborescent phases rich in Fe and Si with a small amount of Ni are circled. On the mapping of the element B, borides rich in Cr and V, large in size, are circled. On the mapping of the element C, vanadium carbides, small in size, are circled.

The characteristics of hardness and the dimensional characteristics of the coating, the HAZ and the substrate are reported in the following table 9:

TABLE 9

| | | Load (kg) | Diagonals (μm) | Vickers hardness (kgf/mm$^2$) | Thickness (μm) |
|---|---|---|---|---|---|
| Coating | | 0.2 | 20.4 ± 0.9 | 893 ± 76 | 1800 |
| Heat-affected zone (HAZ) | Close to the coating | 0.2 | 29.8 ± 0.2 | 418 | 1200 |
| | Close to the substrate | | 45.0 ± 0.4 | 183 | |
| Substrate (15CDV6) | | 0.2 | 43.9 ± 0.7 | 192 ± 5 | — |

Examples 1-A and 1-B correspond to the same energy per mm of displaced beam (linear energy). From one test to the next, the height of the coating (larger when the linear density is larger) and the microstructure of the coating, in particular the amount of borides formed, will be different.

Example 1-A corresponds to what can be termed "hot" conditions (high specific energy); example 1-B corresponds to what can be termed "cold" conditions (low specific energy).

The invention claimed is:

1. A process for surfacing or resurfacing a metal part by laser-assisted deposition of a filler material on a substrate, the substrate comprising more than 50% by weight of iron relative to the total weight of the substrate, wherein the filler material is a powder consisting essentially of C, Si, B, Ni, Cr, V, and Fe, wherein:
   the C is present in an amount of 0.3-2.5% by weight relative to the total weight of the powder,
   the Si is present in an amount of 1.5-3.0% by weight relative to the total weight of the powder,
   the B is present in an amount of 0.1-3.5% by weight relative to the total weight of the powder,
   the Ni is present in an amount of 3.5-5.5% by weight relative to the total weight of the powder,
   the Cr is present in an amount of 5-17% by weight relative to the total weight of the powder,
   the V is present in an amount of 10-17.5% by weight relative to the total weight of the powder, and
   the Fe is present in an amount greater than 50% by weight relative to the total weight of the powder,
   the laser-assisted deposition includes forming a coating of the filler material on the substrate,
   the coating including more than 50% by volume of a matrix, the matrix comprising more than 50% by weight of iron relative to the total weight of the matrix,
   the coating including less than 50% by volume of refractory and hard phases,
   wherein a heat-affected zone (HAZ) is formed in the substrate, at an interface between the substrate and the coating, with a thickness of less than 2 mm, and
   wherein the laser has an operational wavelength ranging from 900 nm to 1100 nm and wherein the process comprises irradiation of the part by a laser beam such that the specific energy (SE), the ratio of the laser power to the mass flow rate of powder, varies from 5 J/mg to 10 J/mg and such that the linear density (LD), the ratio of the mass flow rate of powder to the laser scanning speed, varies from 25 mg/mm to 55 mg/mm.

2. The process according to claim 1, wherein the powder is a mixture
   a. of a melt metal powder P1
   consisting essentially of C, Si, B, Ni, Cr, and Fe, wherein:
      the C is present in an amount of 0.3-3% by weight relative to the total weight of the powder P1,
      the Si is present in an amount of 2-3.0% by weight relative to the total weight of the powder P1,
      the B is present in an amount of 2.5-4.0% by weight relative to the total weight of the powder P1,
      the Ni is present in an amount of 4.0-6.0% by weight relative to the total weight of the powder P1,
      the Cr is present in an amount of 12-16% by weight relative to the total weight of the powder P1, and
      the Fe is present in an amount greater than 50% by weight relative to the total weight of the powder P1,
   b. and of a refractory and hard ceramic powder P2
   consisting essentially of C and V, wherein:
      the C is present in an amount of 10-20% by weight relative to the total weight of the powder P2, and
      the V is present in an amount of 80-90% by weight relative to the total weight of the powder P2.

3. The process according to claim 2, wherein the powder P2 has a Vickers hardness varying from 2000 $HV_{0.1}$ to 3000 $HV_{0.1}$.

4. The process according to claim 2, wherein the powder P1 has a Vickers hardness varying from 800 $HV_{0.2}$ to 1400 $HV_{0.2}$.

5. The process according to claim 2, wherein the powder comprises 10% to 30% by weight of P2 and, respectively, 90% to 70% by weight of P1, relative to the total weight of the mixture of the two powders P1+P2.

6. The process according to claim 1, wherein the pitch varies from 2.5 mm to 4 mm and the covering ratio varies from 50% to 65%.

7. The process according to claim 1, wherein the specific energy varies from 8 J/mg to 11 J/mg or from 5 J/mg to 8 J/mg and the linear density of the deposition varies from 30 mg/mm to 50 mg/mm.

8. The process according to claim 1, wherein the laser spot has a diameter varying from 4 mm to 7 mm.

9. A surfaced or resurfaced metal part, comprising:
a substrate comprising more than 50% by weight of iron relative to the total weight of the substrate,
a coating, deposited on said substrate, containing
more than 50% by volume of a matrix, the matrix comprising more than 50% by weight of iron relative to the total weight of the matrix,
less than 50% by volume of refractory and hard phases, the coating consisting essentially of C, Si, B, Ni, Cr, V, and Fe, wherein:
the C is present in an amount of 0.3-2.5% by weight relative to the total weight of the coating,
the Si is present in an amount of 1.5-3.0% by weight relative to the total weight of the coating,
the B is present in an amount of 0.1-3.5% by weight relative to the total weight of the coating,
the Ni is present in an amount of 3.5-5.5% by weight relative to the total weight of the coating,
the Cr is present in an amount of 5-17% by weight relative to the total weight of the coating,
the V is present in an amount of 10-17.5% by weight relative to the total weight of the coating, and
the Fe is present in an amount greater than 50% by weight relative to the total weight of the coating,
and a heat-affected zone (HAZ) in the substrate, at an interface between the substrate and the coating, with a thickness of less than 2 mm.

10. The part according to claim 9, wherein the coating has a thickness varying from 0.5 mm to 1.2 mm after rectification.

11. The part according to claim 9, wherein both the refractory and the hard phases are vanadium carbides and chromium borides.

12. The part according to claim 11, wherein the size of the carbides is less than or equal to 2.5 µm and the size of the borides varies between 3 µm and 15 µm.

13. The part according to claim 9, wherein the coating has an average hardness of greater than 750 $HV_{0.2}$.

14. The part according to claim 9, wherein the coating has a mean hardness of greater than 800 $HV_{0.2}$.

15. The part according to claim 9, wherein the heat-affected zone has a thickness of less than 1.5 mm.

16. The part according to claim 9, wherein the heat-affected zone has a thickness of less than or equal to 1.2 mm.

17. The part according to claim 9, wherein the part is an extrusion cylinder, the coating being deposited by resurfacing a portion of a concave face of the cylinder.

18. The part according to claim 9, wherein the part is an extrusion screw, the coating being deposited by resurfacing the crown wall of at least one raised part of the extrusion screw.

19. A pre-alloy in powder form,
the powder consisting essentially of C, Si, B, Ni, Cr, V, and Fe, wherein:
the C is present in an amount of 0.3-2.5% by weight relative to the total weight of the powder,
the Si is present in an amount of 1.5-3.0% by weight relative to the total weight of the powder,
the B is present in an amount of 0.1-3.5% by weight relative to the total weight of the powder,
the Ni is present in an amount of 3.5-5.5% by weight relative to the total weight of the powder,
the Cr is present in an amount of 5-17% by weight relative to the total weight of the powder,
the V is present in an amount of 10-17.5% by weight relative to the total weight of the powder, and
the Fe is present in an amount greater than 50% by weight relative to the total weight of the powder.

20. The part according to claim 15, wherein the heat-affected zone has a thickness of less than 1.2 mm.

* * * * *